United States Patent
Thoma

(10) Patent No.: US 10,448,163 B2
(45) Date of Patent: *Oct. 15, 2019

(54) ACOUSTIC REPRODUCTION OF A DIGITAL AUDIO MEDIUM IN A MOTOR VEHICLE

(71) Applicant: Bayerische Motoren Werke Aktiengesellschaft, Munich (DE)

(72) Inventor: Stephan Thoma, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,337

(22) Filed: Aug. 24, 2018

(65) Prior Publication Data

US 2018/0367902 A1 Dec. 20, 2018

Related U.S. Application Data

(63) Continuation of application No. PCT/EP2017/053861, filed on Feb. 21, 2017.

(30) Foreign Application Priority Data

Feb. 25, 2016 (DE) ........................ 10 2016 202 966

(51) Int. Cl.
*H04R 5/04* (2006.01)
*G01C 21/36* (2006.01)
(Continued)

(52) U.S. Cl.
CPC ........... *H04R 5/04* (2013.01); *G01C 21/3697* (2013.01); *G08G 1/096708* (2013.01);
(Continued)

(58) Field of Classification Search
CPC ...... H04R 5/04; G08G 1/0968; G08G 1/0967; G10G 21/36; H04N 25/45; H04M 1/725
(Continued)

(56) References Cited

U.S. PATENT DOCUMENTS

2003/0181822 A1 9/2003 Victor

2006/0114757 A1* 6/2006 Theimer ................. G09B 5/06
369/30.01

(Continued)

FOREIGN PATENT DOCUMENTS

DE 103 22 458 A1 12/2004
JP 7-142946 A 6/1995
(Continued)

OTHER PUBLICATIONS

International Search Report (PCT/ISA/210) issued in PCT Application No. PCT/EP2017/053861 dated May 18, 2017 with English translation (five pages).

(Continued)

*Primary Examiner* — Melur Ramakrishnaiah
(74) *Attorney, Agent, or Firm* — Crowell & Moring LLP

(57) ABSTRACT

A method is provided for acoustically reproducing a digital audio medium, in particular an audiobook, in a motor vehicle, in particular a two- or four-wheel motor vehicle, which has a navigation system that determines the current geographical position of the vehicle, wherein at least first information on the roadway section currently being traversed is assigned to the geographical position. In order to reproduce a digital audio medium in a motor vehicle in a user-friendly manner, the following steps are proposed: a first comparison is carried out in order to determine whether the information on the roadway section currently being traversed, the information being assigned to the current geographical position, indicates a roadway section which requires increased attention from the operator of the motor vehicle; in the event of a positive first comparison, the reproduction of the audio medium is interrupted; a second comparison is carried out in order to determine whether the information on the roadway section currently being traversed, the information being assigned to the current geographical position, continues to indicate a roadway section which requires increased attention from the operator of the motor vehicle; in the event of a positive second comparison, the reproduction of the audio medium is further interrupted; and in the event of a negative second comparison, the reproduction of the audio medium is continued.

13 Claims, 1 Drawing Sheet

(51) Int. Cl.
*H04M 1/725* (2006.01)
*H04N 21/45* (2011.01)
*H04N 21/414* (2011.01)
*H04N 21/439* (2011.01)
*G08G 1/0967* (2006.01)
*G08G 1/0968* (2006.01)
*H04M 1/60* (2006.01)

(52) U.S. Cl.
CPC .. *G08G 1/096872* (2013.01); *H04M 1/72577* (2013.01); *H04N 21/41422* (2013.01); *H04N 21/4396* (2013.01); *H04N 21/4524* (2013.01); *H04M 1/6075* (2013.01); *H04M 1/72558* (2013.01); *H04M 1/72572* (2013.01); *H04R 2420/01* (2013.01); *H04R 2430/01* (2013.01)

(58) Field of Classification Search
USPC .......................... 381/86, 71.2, 71.4; 701/572
See application file for complete search history.

(56) References Cited

U.S. PATENT DOCUMENTS

| | | | |
|---|---|---|---|
| 2007/0182529 A1 | 8/2007 | Dobler et al. | |
| 2011/0161006 A1* | 6/2011 | Deurwaarder | G06Q 20/102 701/408 |
| 2013/0165165 A1* | 6/2013 | Macek | H04W 48/04 455/466 |
| 2015/0051752 A1 | 2/2015 | Paszkowicz | |
| 2015/0099495 A1 | 4/2015 | Crosbie et al. | |
| 2015/0253146 A1 | 9/2015 | Annapureddy et al. | |

FOREIGN PATENT DOCUMENTS

| | | |
|---|---|---|
| JP | 8-105753 A | 4/1996 |
| JP | 8-313284 A | 11/1996 |
| WO | WO 2015/086302 A1 | 6/2015 |
| WO | WO 2015/184578 A1 | 12/2015 |

OTHER PUBLICATIONS

German-language Written Opinion (PCT/ISA/237) issued in PCT Application No. PCT/EP2017/053861 dated May 18, 2017 (six pages).

German-language Search Report issued in counterpart German Application No. 10 2016 202 966.5 dated Feb. 9, 2017 with partial English translation (15 pages).

International Search Report (PCT/ISA/210) issued in PCT Application No. PCT/EP2017/053898 dated Jun. 7, 2017 with English translation (five pages).

German-language Written Opinion (PCT/ISA/237) issued in PCT Application No. PCT/EP2017/053898 dated Jun. 7, 2017 (five pages).

German-language Search Report issued in counterpart German Application No. 10 2016 202 968.1 dated Feb. 9, 2017 with partial English translation (12 pages).

* cited by examiner

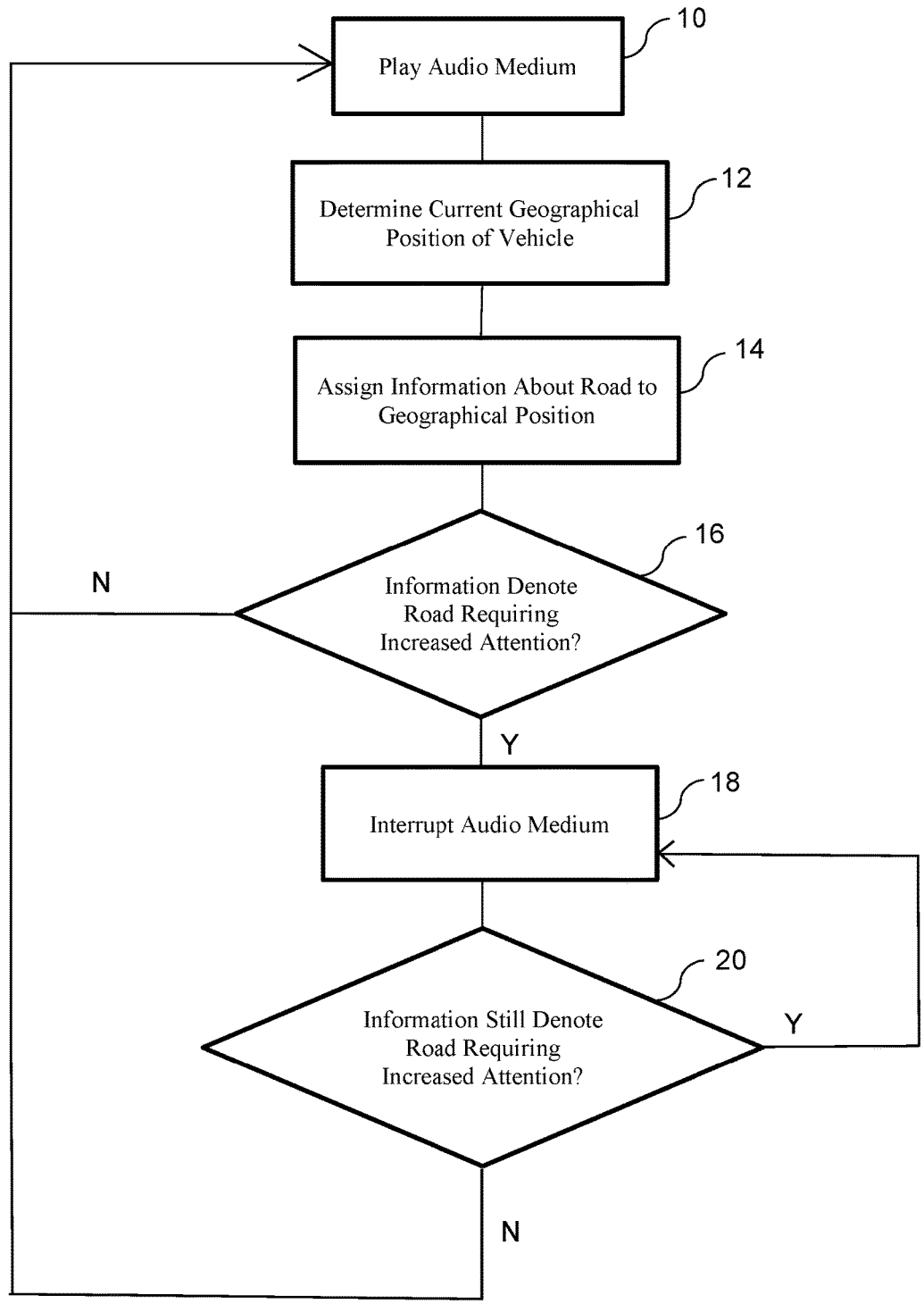

ACOUSTIC REPRODUCTION OF A DIGITAL AUDIO MEDIUM IN A MOTOR VEHICLE

CROSS REFERENCE TO RELATED APPLICATIONS

This application is a continuation of PCT International Application No. PCT/EP2017/053861, filed Feb. 21, 2017, which claims priority under 35 U.S.C. § 119 from German Patent Application No. 10 2016 202 966.5, filed Feb. 25, 2016, the entire disclosures of which are herein expressly incorporated by reference.

This application contains subject matter related to U.S. application Ser. No. 16/111,364, entitled "Acoustic Playback of a Digital Audio Medium in a Motor Vehicle" filed on even date herewith.

BACKGROUND AND SUMMARY OF THE INVENTION

The invention relates in particular to a method for acoustic reproduction of a digital audio medium, in particular an audio book, in a motor vehicle, in particular a two- or four-wheeled motor vehicle, that has a navigation system that determines the current geographical position of the vehicle, and the geographical position is assigned at least one first piece of information about the currently traveled section of road.

Known methods for reproducing a digital audio medium in a motor vehicle are not very user friendly.

The object of the invention is, in particular, to provide a method for user-friendly reproduction of a digital audio medium in a motor vehicle.

This object is achieved in particular by a method for acoustic reproduction of a digital audio medium, in particular an audio book, in a motor vehicle, in particular a two or four-wheeled motor vehicle, that has a navigation system that determines the current geographical position of the vehicle, and the geographical position is assigned at least one first piece of information about the currently traveled section of road, characterized by the following steps: first comparing whether the information assigned to the current geographical position about the currently traveled section of road denotes a section of road that requires increased attentiveness from the driver of the motor vehicle, in the event of a positive first comparison, the reproduction of the audio medium is interrupted, second comparing whether the information assigned to the current geographical position about the currently traveled section of road continues to denote a section of road that requires increased attentiveness from the driver of the motor vehicle, in the event of a positive second comparison, the reproduction of the audio medium continues to be interrupted, and in the event of a negative second comparison, the reproduction of the audio medium is continued.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic flow chart illustrating an exemplary method according to the invention.

DETAILED DESCRIPTION OF THE DRAWING

Referring to FIG. 1, the invention provides a method for acoustic reproduction of a digital audio medium, in particular an audio book, in a motor vehicle, in particular a two- or four-wheeled motor vehicle, that has a navigation system. According to the method, while an audio medium is being reproduced (10), the navigation system determines the current geographical position of the vehicle (12) and assigns the geographical position at least one first piece of information about the currently traveled section of road (14).

The invention includes the following steps:

In a first step (16), a first comparison takes place for whether the information assigned to the current geographical position about the currently traveled section of road denotes a section of road that requires increased attentiveness from the driver of the motor vehicle.

In the event of a positive first comparison (Y), the reproduction of the audio medium is interrupted in a second step (18).

In a third step (20), a second comparison takes place for whether the information assigned to the current geographical position about the currently traveled section of road continues to denote a section of road that requires increased attentiveness from the driver of the motor vehicle.

In the event of a positive second comparison (Y), the reproduction of the audio medium continues to be interrupted (18) in a fourth step, and in the event of a negative second comparison (N), the reproduction of the audio medium is continued (10) in a fifth step.

In known methods, the audio reproduction in motor vehicles is paused for traffic announcements, for calls using a hands-free system or for announcements by a navigation system. After the respective announcements or calls, the music is continued at the point of interruption. Listening to music in the vehicle can reduce the attentiveness of the driver. This applies in particular for audio books, the majority of which are listened to in motor vehicles. In demanding traffic situations, the driver can no longer follow the content of audio books or is greatly distracted from the traffic situation. Accordingly, when listening to audio books, the driver will frequently rewind after the demanding traffic situation has been overcome. This is not user friendly and distracts the driver additionally.

To avoid these disadvantages, the method according to the invention provides, in summary, for the playback of an audio medium and, in particular, of an audio book, to be interrupted at hazard spots, sharp curves, in dense urban traffic or in or during all driving situations that require a high level of concentration from the driver. Subsequently, the driver can concentrate fully on the driving task required of him. Once this has been overcome, the invention allows for the playback of the auto medium or of the audio book to be continued, in particular from the point of the pause.

In a preferred embodiment of the method according to the invention, it is provided for the continuation of the reproduction to take place at a point on the audio medium that has already been played back before the interruption to the reproduction. As a result, it is advantageously possible to prevent the driver from beginning to look for the point that he still has in memory, which can involve considerable distraction from the traffic.

In one development of the method according to the invention, it is provided for the navigation system to process static map data and/or dynamic traffic data that the navigation system receives from outside the motor vehicle, said data denoting a section of road that requires increased attentiveness from the driver of the motor vehicle. As a result, advice of known and new current hazard spots can be provided.

In accordance with one embodiment of the method according to the invention, the section of road that requires increased attentiveness from the driver of the motor vehicle is a hazard spot, such as in particular roadworks, a sharp curve or a narrowing of the road.

In one embodiment of the method according to the invention, it is provided for the section of road that requires increased attentiveness from the driver of the motor vehicle to be a section of road for which the speed of the motor vehicle determined by the navigation system is markedly below the permissible speed for the section of road, such as in the case of a congestion situation.

In a further embodiment of the method according to the invention, the section of road is defined as a section of road for which the changes of speed of the motor vehicle over time that are determined by the navigation system, such as acceleration and deceleration, are such that the section of road requires increased attentiveness from the driver of the motor vehicle.

Such sections of road usually require greater attentiveness from the driver and are therefore preferably fully or partially taken into consideration for the performance of the method according to the invention.

In accordance with an alternative or complementary embodiment of the method according to the invention, there is provision for the vehicle to have sensors, such as in particular at least one force or acceleration sensor, provided in or on it and for the section of road to be a section of road for which the changes of speed of the motor vehicle over time that are determined by the sensors, such as acceleration and deceleration, braking intensity and/or jerky movements transversely with respect to the direction of movement of the vehicle, are such that it is detectable that the section of road requires increased attentiveness from the driver of the motor vehicle.

These measures can further improve the reliability and hence also the acceptance for use of the method according to the invention.

Further, the invention provides a driver assistance system for acoustic reproduction of a digital audio medium, in particular an audio book, in a motor vehicle. The motor vehicle has a navigation system that determines the current geographical position of the vehicle and assigns the geographical position at least one first piece of information about the currently traveled section of road. According to the invention, there is provision for the driver assistance system to perform at least one step of a method according to the invention.

Further, the invention provides a motor vehicle having a driver assistance system according to the invention.

Finally, the invention also provides a computer program product for controlling at least one processor that prompts the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for acoustic reproduction of a digital audio medium in a motor vehicle equipped with a navigation system that determines a current geographical position of the vehicle, and the current geographical position is assigned at least one first piece of information about a currently traveled section of road, the method comprising the steps of:
   first comparing whether the information assigned to the current geographical position about the currently traveled section of road denotes a section of road that requires increased attentiveness from the driver of the motor vehicle, and
   in the event of a positive first comparison, interrupting the reproduction of the digital audio medium, wherein the digital audio medium is an audio book;
   second comparing whether the information assigned to the current geographical position about the currently traveled section of road continues to denote a section of road that requires increased attentiveness from the driver of the motor vehicle, and
   in the event of a positive second comparison, continuing to interrupt the reproduction of the digital audio medium, and
   in the event of a negative second comparison, continuing the reproduction of the digital audio medium, wherein the continuation of the reproduction takes place at a point on the digital audio medium that has already been played back before the interruption to the reproduction.

2. The method as claimed in claim 1, wherein
   the navigation system processes static map data and/or dynamic traffic data that the navigation system receives from outside the motor vehicle, said data denoting a section of road that requires increased attentiveness from the driver of the motor vehicle.

3. The method as claimed in claim 1, wherein
   the section of road that requires increased attentiveness from the driver of the motor vehicle is a hazard spot.

4. The method as claimed in claim 3, wherein
   the hazard spot is one of a sharp curve, a narrowing road or a road construction area.

5. The method as claimed in claim 1, wherein
   the section of road that requires increased attentiveness from the driver of the motor vehicle is a section of road for which a speed of the motor vehicle determined by the navigation system is markedly below a permissible speed for the section of road.

6. The method as claimed in claim 5, wherein
   the section of road for which the speed of the motor vehicle determined by the navigation system is markedly below the permissible speed for the section of road is a congested section of road.

7. The method as claimed in claim 1, wherein
   the section of road is a section of road for which changes of speed of the motor vehicle over time that are determined by the navigation system are such that the section of road requires increased attentiveness from the driver of the motor vehicle.

8. The method as claimed in claim 7, wherein
   the changes of speed are an acceleration or a deceleration.

9. The method as claimed in claim 1, wherein
   the vehicle has at least one sensor, and
   the section of road is a section of road for which changes of speed of the motor vehicle over time that are determined by the sensor are such that it is detectable that the section of road requires increased attentiveness from the driver of the motor vehicle.

10. The method as claimed in claim 9, wherein
    the at least one sensor comprises at least one force or acceleration sensor, and
    the changes of speed of the motor vehicle over time determined by the at least one sensor occur due to acceleration, deceleration, a braking intensity and/or jerky movements transverse to a direction of movement of the vehicle.

11. A driver assistance system for acoustic reproduction of a digital audio medium in a motor vehicle equipped with a navigation system that determines a current geographical position of the vehicle, and the geographical position is assigned at least one first piece of information about the currently traveled section of road, comprising:
- a processor and associated memory operatively configured to carry out the acts of:
- first comparing whether the information assigned to the current geographical position about the currently traveled section of road denotes a section of road that requires increased attentiveness from the driver of the motor vehicle, and
- in the event of a positive first comparison, interrupting the reproduction of the digital audio medium, wherein the digital audio medium is an audio book;
- second comparing whether the information assigned to the current geographical position about the currently traveled section of road continues to denote a section of road that requires increased attentiveness from the driver of the motor vehicle, and
- in the event of a positive second comparison, continuing to interrupt the reproduction of the digital audio medium, and
- in the event of a negative second comparison, continuing the reproduction of the digital audio medium, wherein the continuation of the reproduction takes place at a point on the digital audio medium that has already been played back before the interruption to the reproduction.

12. A motor vehicle, comprising a driver assistance system as claimed in claim 11.

13. A computer program product comprising a non-transitory computer readable medium having stored thereon program code sections that, when executed by a processor, carry out the acts of:
- first comparing whether information assigned to a current geographical position about a currently traveled section of road denotes a section of road that requires increased attentiveness from a driver of a motor vehicle, and
- in the event of a positive first comparison, interrupting an acoustic reproduction of a digital audio medium, wherein the digital audio medium is an audio book;
- second comparing whether the information assigned to the current geographical position about the currently traveled section of road continues to denote a section of road that requires increased attentiveness from the driver of the motor vehicle, and
- in the event of a positive second comparison, continuing to interrupt the reproduction of the digital audio medium, and
- in the event of a negative second comparison, continuing the reproduction of the digital audio medium, wherein the continuation of the reproduction takes place at a point on the digital audio medium that has already been played back before the interruption to the reproduction.

* * * * *